United States Patent
Wu et al.

(10) Patent No.: US 9,886,923 B2
(45) Date of Patent: Feb. 6, 2018

(54) DRIVING CIRCUIT FOR SOURCE DRIVING CHIPS AND LIQUID CRYSTAL DISPLAY PANEL

(71) Applicant: Shenzhen China Star Optoelectronics Technology Co., Ltd., Shenzhen, Guangdong (CN)

(72) Inventors: Jingjing Wu, Guangdong (CN); Zhi Xiong, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 106 days.

(21) Appl. No.: 14/888,750

(22) PCT Filed: Aug. 21, 2015

(86) PCT No.: PCT/CN2015/087784
§ 371 (c)(1),
(2) Date: Nov. 3, 2015

(87) PCT Pub. No.: WO2017/020354
PCT Pub. Date: Feb. 9, 2017

(65) Prior Publication Data
US 2017/0162142 A1    Jun. 8, 2017

(30) Foreign Application Priority Data
Aug. 4, 2015 (CN) .......................... 2015 1 0470829

(51) Int. Cl.
*G09G 3/36* (2006.01)
*G02F 1/1345* (2006.01)
*G02F 1/1368* (2006.01)

(52) U.S. Cl.
CPC ......... *G09G 3/3648* (2013.01); *G02F 1/1368* (2013.01); *G02F 1/13454* (2013.01);
(Continued)

(58) Field of Classification Search
CPC ......... G09G 3/3648; G09G 2300/0408; G09G 2310/0291; G09G 2310/061;
(Continued)

(56) References Cited

U.S. PATENT DOCUMENTS

| | | | |
|---|---|---|---|
| 2009/0167747 A1* | 7/2009 | Gong | G09G 3/3688 345/212 |
| 2012/0139883 A1* | 6/2012 | Lee | G09G 3/3611 345/204 |
| 2014/0104261 A1* | 4/2014 | Cheng | G09G 3/3696 345/212 |

* cited by examiner

*Primary Examiner* — Charles Hicks
(74) *Attorney, Agent, or Firm* — Andrew C. Cheng

(57) ABSTRACT

The present disclosure discloses a driving circuit for a source driving chip. In the driving circuit for a source driving chip, an output terminal of the blanking timer is connected to a control terminal of the switching unit; an input terminal of the switching unit is connected to a power supply source; an output terminal of the switching unit is connected to a supply terminal of the buffer amplifier. The blanking timer is used to generate a control signal; wherein, the control signal is a first voltage level during a row blanking interval or a frame blanking interval; the control signal is a second voltage level during the row non-blanking interval or the frame non-blanking interval. The driving circuit for a source driving chip of the present disclosure can effectively reduce the power consumption.

13 Claims, 4 Drawing Sheets

(52) U.S. Cl.
CPC ............ *G09G 2300/0408* (2013.01); *G09G 2310/0291* (2013.01); *G09G 2310/061* (2013.01); *G09G 2310/08* (2013.01); *G09G 2330/023* (2013.01)

(58) Field of Classification Search
CPC .......... G09G 2310/08; G09G 2330/023; G02F 1/13454; G02F 1/1368
See application file for complete search history.

US 9,886,923 B2

DRIVING CIRCUIT FOR SOURCE DRIVING CHIPS AND LIQUID CRYSTAL DISPLAY PANEL

This application claims the benefit of, and priority to, China Patent Application No. 201510470829.2, filed Aug. 4, 2015, titled "Driving Circuit For Source Driving Chips And Liquid Crystal Display", the entire contents of which are incorporated by reference herein in its entirety.

BACKGROUND

Technical Field

The disclosure is related to a liquid crystal display field, and more particular to a driving circuit for a source driving chip and a liquid crystal display panel.

Related Art

As technology advances, users increasingly demand higher visual experience. A variety of electronic products with high-definition and large-screen become increasingly popular. In terms of the LCD panel, larger screens have higher resolution, and thus the power consumption is naturally larger However, the greater power consumption results in higher temperature of the liquid crystal panel, and thus the operation stability of the liquid crystal panel is affected. Moreover, it does not conform to the requirements of energy conservation which has been advocated.

As shown in FIG. 1, the LCD employs a source driver chip and a gate driver chip to drive each pixel for display. When the first row of pixels is scanned, the gate driving chip inputs turn-on signals to the first row of pixels so that the first row of pixels are at the on state. At this time, the driving source chip inputs the data signals to the first row of pixels input data signal, and thus the first row of pixels is lighted up. After the first row of pixels is scanned, the manner described above continues to scan the second row of pixels until all the rows of pixels on the LCD panel are scanned. A frame scanning is completed. It is appreciated that a certain time interval exists between the end of this row scanning and before the next row scan begins, and this time interval is called as the row blanking interval. Similarly, a certain time interval also exists between the end of a frame scan and before the next frame starts, and this time interval is called as the frame blanking interval. During the periods of the row blanking interval and the frame blanking interval, the buffer amplifier in the source driving chip does not output data. However, due to the design of the existing source driver chip, the static current still exists when the buffer amplifier does not output data such that unnecessary power consumption occurs.

SUMMARY

An embodiment of the present disclosure provides a driving circuit for a source driving chip and a liquid crystal display panel, thereby decreasing the power consumption.

The present disclosure provides a driving circuit for a source driving chip, comprising: a blanking timer, a switching unit, a buffer amplifier, a voltage level conversion circuit and a switching device, wherein an output terminal of the blanking timer is connected to a control terminal of the switching unit; an input terminal of the switching unit is connected to a power supply source; an output terminal of the switching unit is connected to a supply terminal of the buffer amplifier; the switching unit and the buffer amplifier are integrated in the source driving chip; the blanking timer is used to generate a control signal; wherein, the control signal is a first voltage level during a row blanking interval or a frame blanking interval; the control signal is a second voltage level during the row non-blanking interval or the frame non-blanking interval; an input terminal of the voltage level conversion circuit is connected to the output terminal of the blanking timer; the output terminal of the voltage level conversion circuit is connected to a control terminal of the switching device; an input terminal of the switching device is connected to the power supply source; an output terminal of the switching device is connected to a supply terminal of the buffer amplifier; the voltage level conversion circuit is used to convert a voltage level of the control signal outputted from the blanking timer and obtain a converted voltage level suitable for the switching device; the switching device is used to receive the converted voltage level; the supply terminal of the buffer amplifier is not supplied with the power supply source through the switching unit in the off state when the converted voltage level is the first voltage level; and the supply terminal of the buffer amplifier is supplied with the power supply source through the switching unit in the on state when the converted voltage level is a second voltage level.

In one embodiment, the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is connected to an output terminal of the third switching transistor and a control terminal of the fourth switching transistor; an output terminal of the first switching transistor is connected to a ground; an input terminal of the third switching transistor is connected to the power supply source; a control terminal of the second switching transistor is inputted with the control signal generated from the blanking timer; an input terminal of the second switching transistor is connected to an output terminal of the fourth switching transistor and a control terminal of the third switching transistor; an output terminal of the second switching transistor is connected to the ground; an input terminal of the fourth switching transistor is connected to the power supply source; the input terminal of the second switching transistor, the output terminal of the fourth switching transistor and a common terminal of the control terminal of the third switching transistor is connected to a control terminal of the fifth switching transistor; an input terminal of the fifth switching transistor is connected to the power supply source; an output terminal of the fifth switching transistor is connected to the supply terminal of the buffer amplifier;

when the control signal is a first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is a second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

In one embodiment, the fifth switching transistor is a field-effect transistor.

The present disclosure further provides a driving circuit for a source driving chip comprising a blanking timer, a switching unit and a buffer amplifier, wherein the buffer amplifier is integrated in the source driving chip; an output terminal of the blanking timer is connected to a control terminal of the switching unit; an input terminal of the switching unit is connected to a power supply source; an output terminal of the switching unit is connected to a supply terminal of the buffer amplifier;

the blanking timer is used to generate a control signal; wherein, the control signal is a first voltage level during a row blanking interval or a frame blanking interval; the control signal is a second voltage level during the row non-blanking interval or the frame non-blanking interval;

the supply terminal of the buffer amplifier is not supplied from the power supply source through the switching unit in the off state when the switching unit used to be the control signal is a first voltage level; and the supply terminal of the buffer amplifier is supplied from the power supply source through the switching unit in the on state when the switching unit used to be the control signal is a second voltage level.

In one embodiment, the switching unit comprises a voltage level conversion circuit and a switching device; an input terminal of the voltage level conversion circuit is connected to the output terminal of the blanking timer; the output terminal of the voltage level conversion circuit is connected to a control terminal of the switching device; an input terminal of the switching device is connected to the power supply source; an output terminal of the switching device is connected to a supply terminal of the buffer amplifier;

the voltage level conversion circuit is used to convert a voltage level of the control signal outputted from the blanking timer and obtain a converted voltage level suitable for the switching device;

the switching device is used to receive the converted voltage level; the supply terminal of the buffer amplifier is not supplied with the power supply source through the switching unit in the off state when the converted voltage level is the first voltage level; and the supply terminal of the buffer amplifier is supplied with the power supply source through the switching unit in the on state when the converted voltage level is a second voltage level.

In one embodiment, the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is connected to an output terminal of the third switching transistor and a control terminal of the fourth switching transistor; an output terminal of the first switching transistor is connected to a ground; an input terminal of the third switching transistor is connected to the power supply source; a control terminal of the second switching transistor is inputted with the control signal generated from the blanking timer; an input terminal of the second switching transistor is connected to an output terminal of the fourth switching transistor and a control terminal of the third switching transistor; an output terminal of the second switching transistor is connected to the ground; an input terminal of the fourth switching transistor is connected to the power supply source; the input terminal of the second switching transistor, the output terminal of the fourth switching transistor and a common terminal of the control terminal of the third switching transistor is connected to a control terminal of the fifth switching transistor; an input terminal of the fifth switching transistor is connected to the power supply source; an output terminal of the fifth switching transistor is connected to the supply terminal of the buffer amplifier;

when the control signal is a first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is a second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

In one embodiment, the fifth switching transistor is a field-effect transistor.

In one embodiment, the switching unit is integrated in the source driving chip.

The present disclosure further provides a liquid crystal display panel, comprising a first substrate, a liquid crystal layer and a second substrate, wherein a driving circuit for a source driving chip is formed on the second substrate; the driving circuit of the source driving chip comprises: a blanking timer, a switching unit and a buffer amplifier, wherein the buffer amplifier is integrated in the source driving chip; an output terminal of the blanking timer is connected to a control terminal of the switching unit; an input terminal of the switching unit is connected to a power supply source; an output terminal of the switching unit is connected to a supply terminal of the buffer amplifier;

the blanking timer is used to generate a control signal; wherein, the control signal is a first voltage level during a row blanking interval or a frame blanking interval; the control signal is a second voltage level during the row non-blanking interval or the frame non-blanking interval;

the supply terminal of the buffer amplifier is not supplied from the power supply source through the switching unit in the off state when the switching unit used to be the control signal is a first voltage level; and the supply terminal of the buffer amplifier is supplied from the power supply source through the switching unit in the on state when the switching unit used to be the control signal is a second voltage level.

In one embodiment, the switching unit comprises a voltage level conversion circuit and a switching device; an input terminal of the voltage level conversion circuit is connected to the output terminal of the blanking timer; the output terminal of the voltage level conversion circuit is connected to a control terminal of the switching device; an input terminal of the switching device is connected to the power supply source; an output terminal of the switching device is connected to a supply terminal of the buffer amplifier;

the voltage level conversion circuit is used to convert a voltage level of the control signal outputted from the blanking timer and obtain a converted voltage level suitable for the switching device;

the switching device is used to receiving the converted voltage level; the supply terminal of the buffer amplifier is not supplied from the power supply source through the switching unit in the off state when the converted voltage level is a first voltage level; and the supply terminal of the buffer amplifier is supplied from the power supply source through the switching unit in the on state when the converted voltage level is a second voltage level.

In one embodiment, the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is connected to an output terminal of the third switching transistor and a control terminal of the fourth switching transistor; an output terminal of the first switching transistor is connected to a ground; an input terminal of the third switching transistor is connected to the power supply source; a control terminal of the second switching transistor is inputted with the control signal generated from the blanking timer; an input terminal of the second switching transistor is connected to an output terminal of the fourth switching transistor and a control terminal of the third switching transistor; an output terminal of the second switching transistor is connected to the ground; an input terminal of the fourth switching transistor is connected to the power supply source; the input terminal of the second switching transistor, the output terminal of the fourth switching transistor and a common terminal of the control terminal of the third switching transistor is connected to a control terminal of the fifth switching transistor; an input terminal of the fifth switching transistor is connected to the power supply source; an output terminal of the fifth switching transistor is connected to the supply terminal of the buffer amplifier;

when the control signal is a first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is a second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

In one embodiment, the fifth switching transistor is a field-effect transistor.

In one embodiment, the switching unit is integrated in the source driving chip.

The blanking timer and the switch unit are employed in the above-described embodiments. The blanking timer is used to generate a first voltage level during the row blanking interval or the frame blanking interval; the blanking timer is used to generate a second voltage level inputted to the switch unit during the row non-blanking interval or the frame non-blanking interval such that the supply terminal of the buffer amplifier is not supplied with the power form the power supply source through the switching unit, and therefore there is no static current through the buffer amplifier to cause the unnecessary power consumption.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. It will be apparent, however, that the disclosure may be practiced by one or more embodiments, and the specific embodiments provided herein cannot be interpreted to limit the disclosure. On the contrary, those embodiments are provided to explain the principle and the application of the disclosure such that those skilled in the art may understand the various embodiments of the disclosure and the various modifications for specific expected application.

Figure 1:
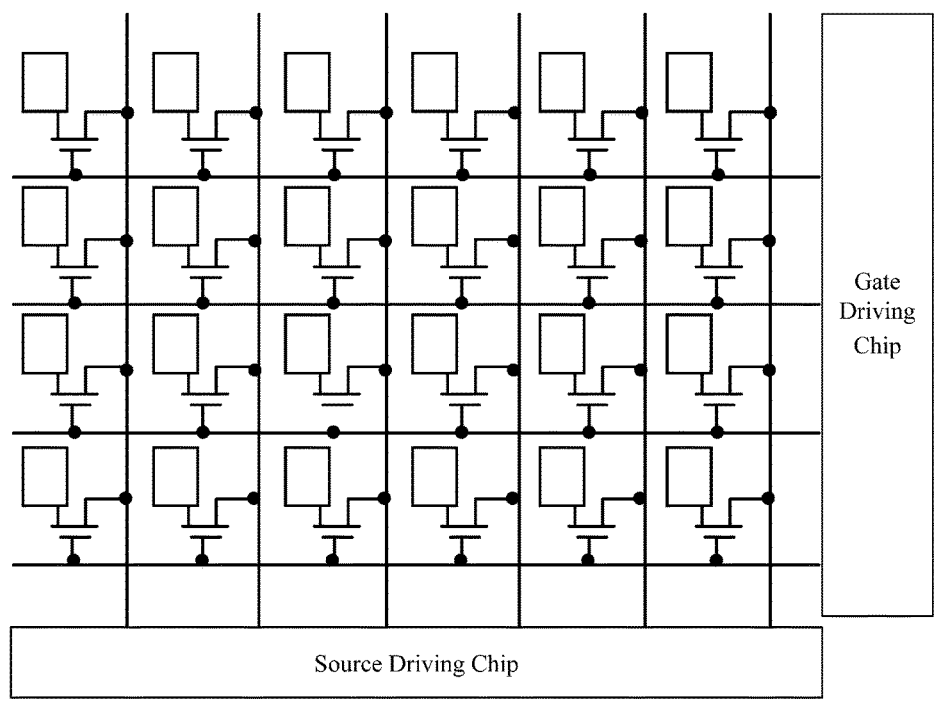
FIG. 1 is a circuit diagram of the liquid crystal driving circuit according to an embodiment of the prior art.
Figure 2:
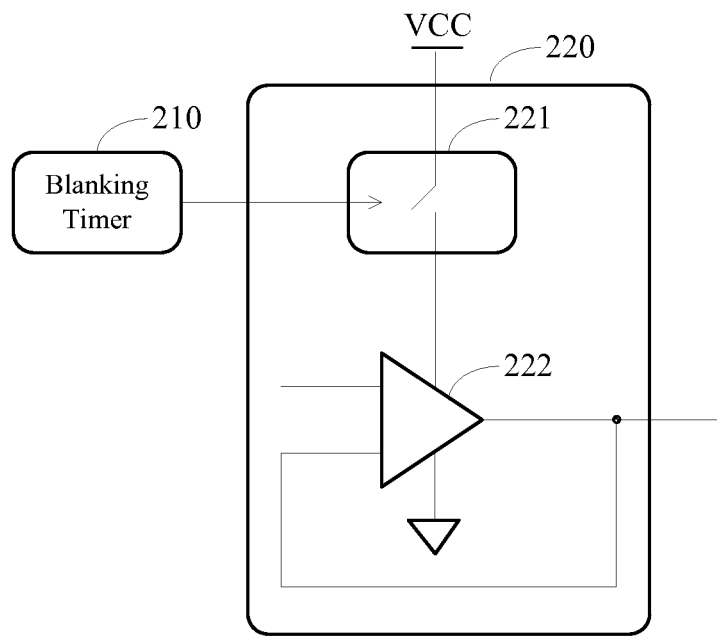
FIG. 2 is a circuit diagram of the driving circuit for a source driving chip according to an embodiment of the present disclosure.

Please refer to FIG. 2. FIG. 2 is a circuit diagram of the driving circuit for a source driving chip according to an embodiment of the present disclosure. The driving circuit for a source driving chip of the present embodiment comprises: a blanking timer 210, a switching unit 221 and a buffer amplifier 222. In one embodiment, the switching unit 221 and the buffer amplifier 222 are integrated in the source driving chip 220. In another embodiment, the switching unit 221 is not integrated in the source driving chip 220. An output terminal of the blanking timer 210 is connected to a control terminal of the switching unit 221. An input terminal of the switching unit 221 is connected to a power supply source VCC. An output terminal of the switching unit 221 is connected to a supply terminal of the buffer amplifier 222.

Since the periods of the row blanking interval and the frame blanking interval are fixed, the blanking timer 210 can be set to generate a first voltage level during the row blanking interval or the frame blanking interval and generate a second voltage level during the row non-blanking interval or the frame non-blanking interval. The signal is outputted to the switching unit 221 for a control signal of the switching unit 221. In the present embodiment, the first voltage level is high voltage level and the second voltage level is low voltage level. In another embodiment, the first voltage level is low voltage level and the second voltage level is high voltage level. The switching unit 221 is in the off state when the control signal is the first voltage level. At this time, the buffer amplifier 222 is not supplied with the power supply source VCC through the switching unit 221, and therefore there is no static current in the buffer amplifier 222. The switching unit 221 is in the on state when the control signal is the second voltage level. At this time, the buffer amplifier 222 is supplied with the power supply source VCC through the switching unit 221, and the data are inputted to the scanned pixel through the buffer amplifier 222 to ignite the pixel.

In the above-described embodiment, by setting the blanking timer and a switching unit, the blanking timer is used to generate a first voltage level during a row blanking interval or a frame blanking interval; the blanking timer is used to generate a second voltage level and the switch unit is inputted during the row non-blanking interval or the frame non-blanking interval such that the supply terminal of the buffer amplifier is not supplied with the power form the power supply source through the switching unit, and therefore there is no static current through the buffer amplifier to cause the unnecessary power consumption.

Figure 3:
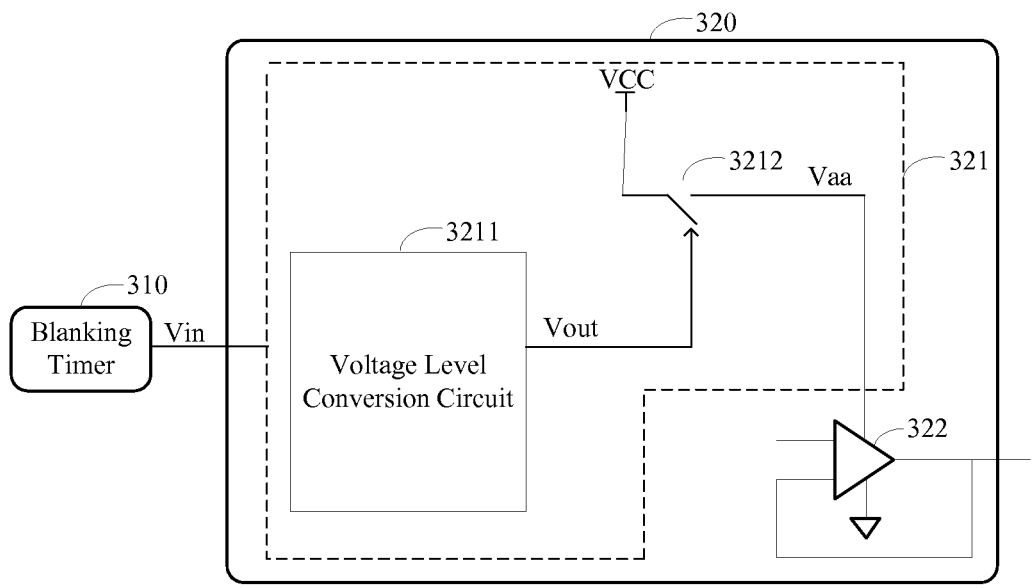
FIG. 3 is a circuit diagram of the driving circuit for a source driving chip according to an embodiment of the present disclosure.

Please refer to FIG. 3. FIG. 3 is a circuit diagram of the driving circuit for a source driving chip according to an embodiment of the present disclosure. The driving circuit for a source driving chip of the present embodiment comprises: a blanking timer 310, a switching unit 321 and a buffer amplifier 322. In one embodiment, the switching unit 321 and the buffer amplifier 322 are integrated in the source driving chip 220. In another embodiment, the switching unit 321 does not be integrated in the source driving chip 320. Therefore, the switching unit 321 comprises a voltage level conversion circuit 3211 and a switching device 3212. An input terminal of the voltage level conversion circuit 3211 is connected to the output terminal of the blanking timer 310. The output terminal of the voltage level conversion circuit 3211 is connected to a control terminal of the switching device 3212. An input terminal of the switching device 3212 is connected to the power supply source. An output terminal of the switching device is connected to a supply terminal of the buffer amplifier 322.

Figure 4:
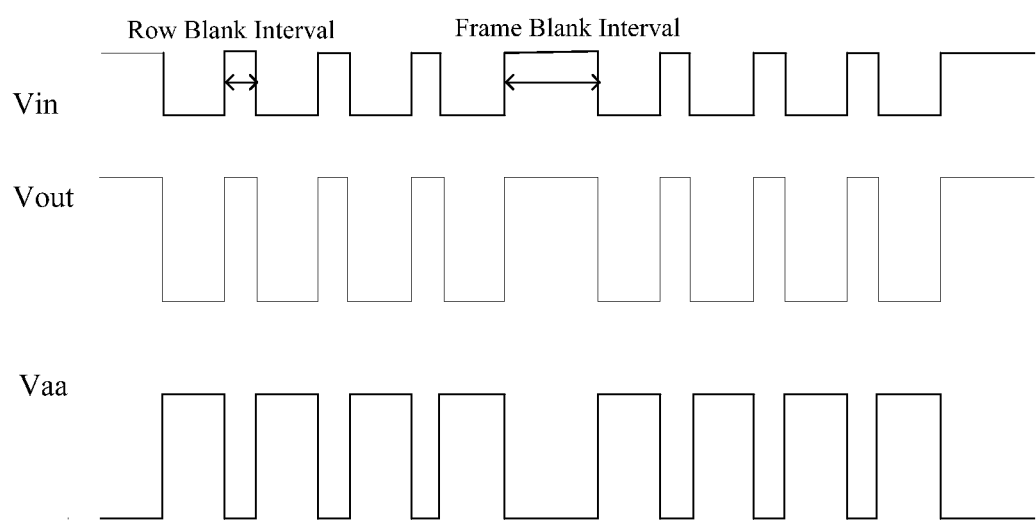
FIG. 4 is a timing chart of the control signal of the driving circuit, the signal of the voltage level conversion circuit and the output signal of the switch unit for a source driving chip according to an embodiment of the present disclosure.

Please refer to FIG. 4. Since the periods of the row blanking interval and frame blanking interval are fixed, the blanking timer 310 can be set to generate a first voltage level during the row blanking interval or the frame blanking interval and generate a second voltage level during the row non-blanking interval or the frame non-blanking interval such that the control signal Vin is shown in FIG. 4 and the control signal Vin is outputted to the voltage level conversion circuit 3211. In the present embodiment, the first voltage level is high voltage level and the second voltage level is low voltage level. In another embodiment, the first voltage level is low voltage level and the second voltage level is high voltage level.

After the voltage level conversion circuit 3211 receives the control signal Vin outputted from the blanking timer 310, the voltage level is converted and the signal is outputted from the voltage level conversion circuit 3211 suitable for the switching device 3212. For example, the high voltage level of the control signal Vin is 3.3V and the low voltage level is 0V. After the voltage level converting, the high voltage level of the signal Vout outputted from the voltage level conversion circuit 3211 is 5V and the low voltage level is −5V etc.

The signal Vout outputted from the voltage level conversion circuit 3211 inputs to the switching device 3212. Wherein, the signal Vaa outputted from the switching device 3212 is the inverse of the signal of the voltage level conversion circuit 3211. When the signal Vout outputted from the voltage level conversion circuit 3211 is the high voltage level, the switching device 3212 turns off. At this time, the buffer amplifier 322 is not supplied with the power supply source VCC through the switching device 3212, and therefore there is no static current in the buffer amplifier 322 and no power consumption is generated. When the signal Vout outputted from the voltage level conversion circuit 3211 is the low voltage level, the switching device 3212 turns on. At this time, the buffer amplifier 322 is supplied with the power supply source VCC through the switching device 3212, and the data is inputted to the scanned pixel through the buffer amplifier 322 to light up the pixel.

In the above-described embodiment, by setting the blanking timer and a switching unit, the blanking timer is used to generate a first voltage level during a row blanking interval or a frame blanking interval; the blanking timer is used to generate a second voltage level and the switch unit is inputted during the row non-blanking interval or the frame non-blanking interval such that the supply terminal of the buffer amplifier is not supplied with the power form the power supply source through the switching unit, and therefore there is no static current through the buffer amplifier to cause the unnecessary power consumption.

Figure 5:
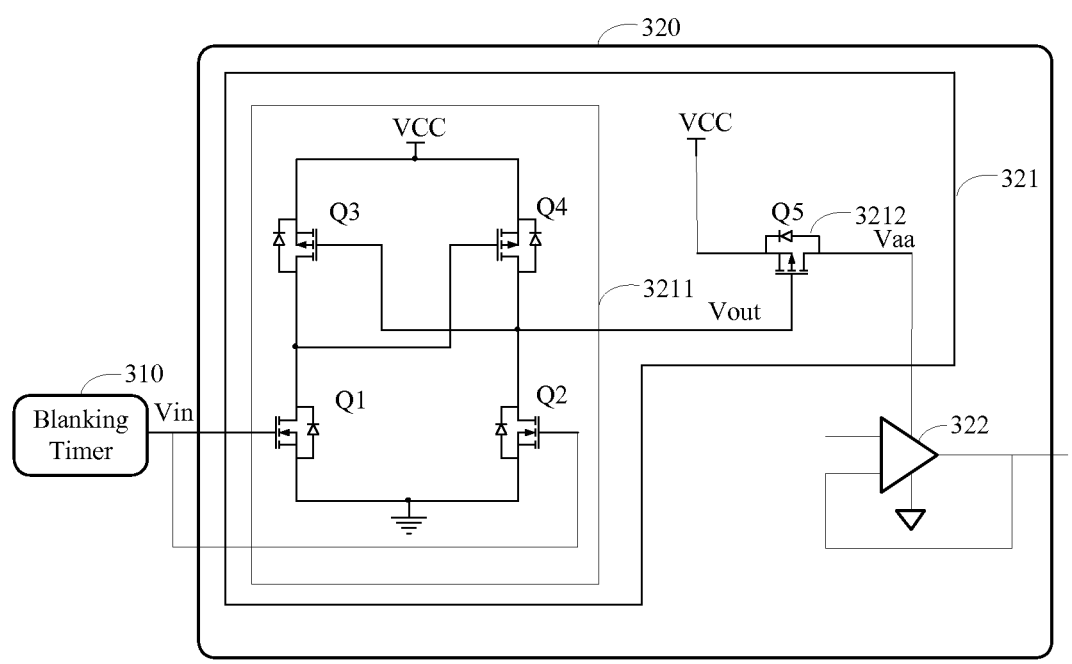
FIG. 5 is a circuit diagram of the driving circuit for a source driving chip according to another embodiment of the present disclosure.

Please refer to FIG. 5. FIG. 5 is a circuit diagram of the driving circuit for a source driving chip according to another embodiment of the present disclosure. The driving circuit for a source driving chip of the present embodiment comprises: a blanking timer 310, a switching unit 321 and a buffer amplifier 322. In one embodiment, the switching unit 321 and the buffer amplifier 322 are integrated in the source driving chip 320. In another embodiment, the switching unit 321 does not be integrated in the source driving chip 320. The switching unit 321 comprises a voltage level conversion circuit 3211 and a switching device 3212. Wherein, the voltage level conversion circuit 3211 comprises a first switching transistor Q1, a second switching transistor Q2, a third switching transistor Q3 and fourth switching transistor Q4. The switching device 3212 is a fifth switching transistor Q5 and the fifth switching transistor is field-effect transistor.

A control terminal of the first switching transistor Q1 is inputted with the control signal generated from the blanking timer 310. An input terminal of the first switching transistor Q1 is connected to an output terminal of the third switching transistor Q3 and a control terminal of the fourth switching transistor Q4. An output terminal of the first switching transistor Q1 is connected to a ground. An input terminal of the third switching transistor Q3 is connected to the power supply source. A control terminal of the second switching transistor Q2 is inputted with the control signal generated from the blanking timer 310. An input terminal of the second switching transistor Q2 is connected to an output terminal of the fourth switching transistor Q4 and a control terminal of the third switching transistor Q3. An output terminal of the second switching transistor Q2 is connected to the ground. An input terminal of the fourth switching transistor Q4 is connected to the power supply source. The input terminal of the second switching transistor Q2, the output terminal of the fourth switching transistor Q4 and a common terminal of the control terminal of the third switching transistor Q3 is connected to a control terminal of the fifth switching transistor Q5. An input terminal of the fifth switching transistor Q5 is connected to the power supply source. An output terminal of the fifth switching transistor Q5 is connected to the supply terminal of the buffer amplifier 322.

Please also refer to FIG. 4, since the periods of the row blanking interval and the frame blanking interval are fixed, the blanking timer 310 can be set to generate a first voltage level during the row blanking interval or the frame blanking interval, and generate a second voltage level during the row non-blanking interval or the frame non-blanking interval such that the control signal Vin is shown in FIG. 4 and the control signal Vin is outputted to the voltage level conversion circuit 3211. In the present embodiment, the first voltage level is high voltage level and the second voltage level is low voltage level.

After the voltage level conversion circuit 3211 receives the control signal Vin outputted from the blanking timer 310, the voltage level is converted and the signal is outputted from the voltage level conversion circuit 3211 suitable for the switching device 3212. For example, the high voltage level of the control signal Vin is 3.3V and the low voltage level is 0V. After the voltage level converting, the high voltage level of the signal Vout outputted from the voltage level conversion circuit 3211 is 5V and the low voltage level is −5V etc. Specifically, when the blanking timer 310 outputs the high voltage level (first voltage level), the first switching transistor Q1 turns off, the second switching transistor Q2 turns off, the third switching transistor Q3 turns on, the four switching transistor Q4 turns on such that outputs the high voltage level. At this time, the fifth switching transistor Q5 turns off. The buffer amplifier 322 is not supplied with the power supply source VCC through the fifth switching transistor Q5, and therefore there is no static current through the buffer amplifier to cause the unnecessary power consumption.

When the blanking timer 310 outputs the low voltage level (second voltage level), the first switching transistor Q1 turns on, the second switching transistor Q2 turns on, the third switching transistor Q3 turns off, the four switching transistor Q4 turns off such that outputs the low voltage level. At this time, the fifth switching transistor Q5 turns on. The buffer amplifier 322 is supplied with the power supply source VCC through the fifth switching transistor Q5, and the data are inputted to the scanned pixel through the buffer amplifier 322 to light up the pixel.

In the above-described embodiment, by setting the blanking timer and a switching unit, the blanking timer is used to generate a first voltage level during a row blanking interval or a frame blanking interval; the blanking timer is used to generate a second voltage level and the switch unit is inputted during the row non-blanking interval or the frame non-blanking interval such that the supply terminal of the buffer amplifier is not supplied with the power form the power supply source through the switching unit, and therefore there is no static current through the buffer amplifier to cause the unnecessary power consumption.

The present disclosure also provides a liquid crystal display panel, comprising a first substrate, a liquid crystal layer and a second substrate, wherein a driving circuit for a source driving chip is formed on the second substrate. A driving circuit for a source driving chip is the driving circuit for a source driving chip as described above in FIG. 2 to FIG. 4 and not be repeated here for enumeration.

Those of ordinary skill should understand that the implementation of all or part of the processes of the above embodiment methods may be achieved by using hardware related to a computer program instruction. The program may be stored in a computer readable storage medium, and when the program is executed, it may include the processes such as the embodiments of the above methods. The storage medium may be a magnetic disk, an optical disk, a read-only memory (ROM), or a random access memory (RAM), etc.

The above disclosures only are the preferred embodiments of the present disclosure it can not be used to limit the scope of the present disclosure as claimed, Therefore, the equivalent changes is made according to the present disclosure as claimed, the scope of the present disclosure is still covered.

What is claimed is:

1. A driving circuit for a source driving chip, comprising a blanking timer, a switching unit, a buffer amplifier, a voltage level conversion circuit and a switching device, wherein:

an output terminal of the blanking timer is directly connected to a control terminal of the switching unit; an input terminal of the switching unit is directly connected to a power supply source; an output terminal of the switching unit is directly connected to a supply terminal of the buffer amplifier; the switching unit and the buffer amplifier are integrated in the source driving chip;

the blanking timer is used to generate a control signal; wherein, the control signal is a first voltage level during a row blanking interval or a frame blanking interval; the control signal is a second voltage level different from the first voltage level during the row non-blanking interval or the frame non-blanking interval;

an input terminal of the voltage level conversion circuit is directly connected to the output terminal of the blanking timer; the output terminal of the voltage level conversion circuit is directly connected to a control terminal of the switching device; an input terminal of the switching device is directly connected to the power supply source; an output terminal of the switching device is directly connected to the supply terminal of the buffer amplifier;

the voltage level conversion circuit is used to convert a voltage level of the control signal outputted from the blanking timer and obtain a converted voltage level suitable for the switching device;

the switching device is used to receive the converted voltage level; the supply terminal of the buffer amplifier is not supplied with the power supply source through the switching unit in the off state when the converted voltage level is the first voltage level; and the supply terminal of the buffer amplifier is supplied with the power supply source through the switching unit in the on state when the converted voltage level is the second voltage level.

2. The circuit according to claim 1, wherein the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is directly connected to an output terminal of the third switching transistor and a control terminal of the fourth switching transistor; an output terminal of the first switching transistor is directly connected to a ground; an input terminal of the third switching transistor is directly connected to the power supply source; a control terminal of the second switching transistor is inputted with the control signal generated from the blanking timer; an input terminal of the second switching transistor is directly connected to an output terminal of the fourth switching transistor and a control terminal of the third switching transistor; an output terminal of the second switching transistor is directly connected to the ground; an input terminal of the fourth switching transistor is directly connected to the power supply source; the input terminal of the second switching transistor, the output terminal of the fourth switching transistor and a common terminal of the control terminal of the third switching transistor is directly connected to a control terminal of the fifth switching transistor; an input terminal of the fifth switching transistor is directly connected to the power supply source; an output terminal of the fifth switching transistor is directly connected to the supply terminal of the buffer amplifier;

when the control signal is the first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is the second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

3. The circuit according to claim 2, wherein the fifth switching transistor is a field-effect transistor.

4. A driving circuit for a source driving chip, comprising a blanking timer, a switching unit and a buffer amplifier, wherein the buffer amplifier is integrated in the source driving chip; an output terminal of the blanking timer is directly connected to a control terminal of the switching unit; an input terminal of the switching unit is directly connected to a power supply source; an output terminal of the switching unit is directly connected to a supply terminal of the buffer amplifier;

the blanking timer is used to generate a control signal; wherein, the control signal is a first voltage level during a row blanking interval or a frame blanking interval; the control signal is a second voltage level different from the first voltage level during the row non-blanking interval or the frame non-blanking interval;

the supply terminal of the buffer amplifier is not supplied from the power supply source through the switching unit in the off state when the switching unit used to be the control signal is the first voltage level; and the supply terminal of the buffer amplifier is supplied from the power supply source through the switching unit in the on state when the switching unit used to be the control signal is the second voltage level.

5. The circuit according to claim 4, wherein the switching unit comprises a voltage level conversion circuit and a switching device; an input terminal of the voltage level conversion circuit is directly connected to the output terminal of the blanking timer; the output terminal of the voltage level conversion circuit is directly connected to a control terminal of the switching device; an input terminal of the switching device is directly connected to the power supply source; an output terminal of the switching device is directly connected to the supply terminal of the buffer amplifier;

the voltage level conversion circuit is used to convert a voltage level of the control signal outputted from the blanking timer and obtain a converted voltage level suitable for the switching device;

the switching device is used to receive the converted voltage level; the supply terminal of the buffer amplifier is not supplied with the power supply source through the switching unit in the off state when the converted voltage level is the first voltage level; and the supply terminal of the buffer amplifier is supplied with the power supply source through the switching unit in the on state when the converted voltage level is the second voltage level.

6. The circuit according to claim 5, wherein the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is directly connected to an output terminal of the third switching transistor and a control terminal of the fourth switching transistor; an output terminal of the first switching transistor is directly connected to a ground; an input terminal of the third switching transistor is directly connected to the power supply source; a control terminal of the second switching transistor is inputted with the control signal generated from the blanking timer; an input terminal of the second switching transistor is directly connected to an output terminal of the fourth switching transistor and a control terminal of the third switching transistor; an output terminal of the second switching transistor is directly connected to the ground; an input terminal of the fourth switching transistor is directly connected to the power supply source; the input terminal of the second switching transistor, the output terminal of the fourth switching transistor and a common terminal of the control terminal of the third switching transistor is directly connected to a control terminal of the fifth switching transistor; an input terminal of the fifth switching transistor is directly connected to the power supply source; an output terminal of the fifth switching transistor is directly connected to the supply terminal of the buffer amplifier;

when the control signal is the first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is the second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

7. The circuit according to claim 6, wherein the fifth switching transistor is a field-effect transistor.

8. The circuit according to claim 4, wherein the switching unit is integrated in the source driving chip.

9. A liquid crystal display panel, comprising a first substrate, a liquid crystal layer and a second substrate, wherein a driving circuit for a source driving chip is formed on the second substrate; the driving circuit of the source driving chip comprises: a blanking timer, a switching unit and a buffer amplifier, wherein the buffer amplifier is integrated in the source driving chip; an output terminal of the blanking timer is directly connected to a control terminal of the switching unit; an input terminal of the switching unit is directly connected to a power supply source; an output terminal of the switching unit is directly connected to a supply terminal of the buffer amplifier;

the blanking timer is used to generate a control signal; wherein, the control signal is a first voltage level during a row blanking interval or a frame blanking interval; the control signal is a second voltage level different from the first voltage level during the row non-blanking interval or the frame non-blanking interval;

the supply terminal of the buffer amplifier is not supplied from the power supply source through the switching unit in the off state when the switching unit used to be the control signal is the first voltage level; and the supply terminal of the buffer amplifier is supplied from the power supply source through the switching unit in the on state when the switching unit used to be the control signal is the second voltage level.

10. The liquid crystal display panel according to claim 9, wherein the switching unit comprises a voltage level conversion circuit and a switching device; an input terminal of the voltage level conversion circuit is directly connected to the output terminal of the blanking timer; the output terminal of the voltage level conversion circuit is directly connected to a control terminal of the switching device; an input terminal of the switching device is directly connected to the power supply source; an output terminal of the switching device is directly connected to the supply terminal of the buffer amplifier;

the voltage level conversion circuit is used to convert a voltage level of the control signal outputted from the blanking timer and obtain a converted voltage level suitable for the switching device;

the switching device is used to receiving the converted voltage level; the supply terminal of the buffer amplifier is not supplied from the power supply source through the switching unit in the off state when the converted voltage level is the first voltage level; and the supply terminal of the buffer amplifier is supplied from the power supply source through the switching unit in the on state when the converted voltage level is the second voltage level.

11. The liquid crystal display panel according to claim 10, wherein the voltage level conversion circuit comprises a first switching transistor, a second switching transistor, a third switching transistor and fourth switching transistor; the switching device is a fifth switching transistor; a control terminal of the first switching transistor is inputted with the control signal generated from the blanking timer; an input terminal of the first switching transistor is directly connected to an output terminal of the third switching transistor and a control terminal of the fourth switching transistor; an output terminal of the first switching transistor is directly connected to a ground; an input terminal of the third switching transistor is directly connected to the power supply source; a control terminal of the second switching transistor is inputted with the control signal generated from the blanking timer; an input terminal of the second switching transistor is directly connected to an output terminal of the fourth switching transistor and a control terminal of the third switching transistor; an output terminal of the second switching transistor is connected to the ground; an input terminal of the fourth switching transistor is directly connected to the power supply source; the input terminal of the second switching transistor, the output terminal of the fourth switching transistor and a common terminal of the control terminal of the third switching transistor is directly connected to a control terminal of the fifth switching transistor; an input terminal of the fifth switching transistor is directly connected to the power supply source; an output terminal of the fifth switching transistor is directly connected to the supply terminal of the buffer amplifier;

when the control signal is the first voltage level, the high voltage is outputted from the input terminal of the second switching transistor, the output terminal of the fourth switching transistor and the common terminal of the control terminal of the third switching transistor such that the fifth switching transistor is turned off; the switching unit is at off state such that the supply terminal of the buffer amplifier is not supplied with the power form the power supply source through the switching unit;

when the control signal is the second voltage level, the low voltage is outputted from the input terminal of the second switching transistor, the output terminal of the fourth switching transistor and the common terminal of the control terminal of the third switching transistor such that the fifth switching transistor is turned on; the switching unit is at on state such that the supply terminal of the buffer amplifier is supplied with the power form the power supply source through the switching unit.

12. The liquid crystal display panel according to claim 11, wherein the fifth switching transistor is a field-effect transistor.

13. The liquid crystal display panel according to claim 9, wherein the switching unit is integrated in the source driving chip.

* * * * *